May 21, 1940.  W. E. DISNEY  2,201,689
ART OF ANIMATION
Filed Sept. 1, 1936  4 Sheets-Sheet 1
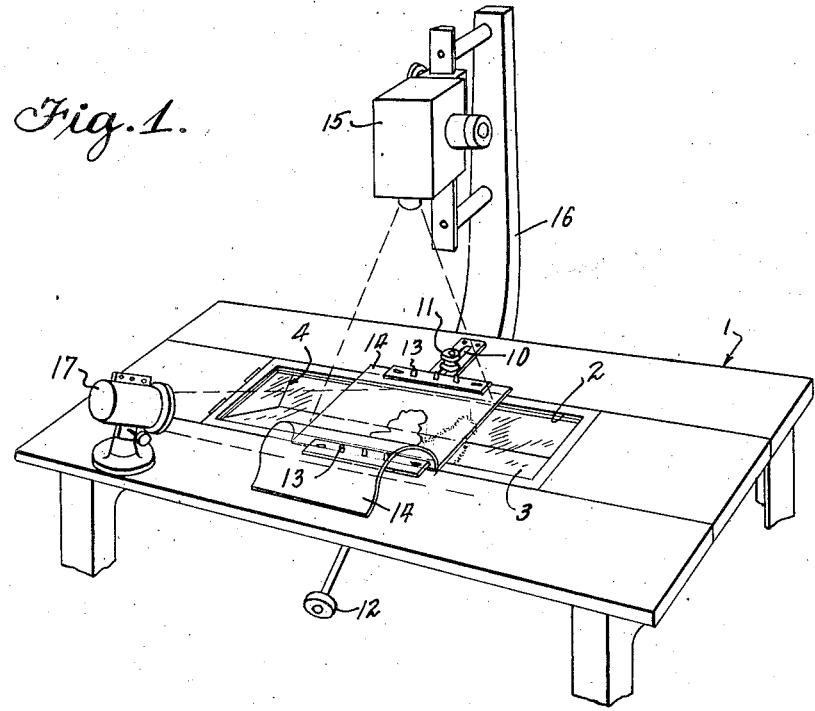
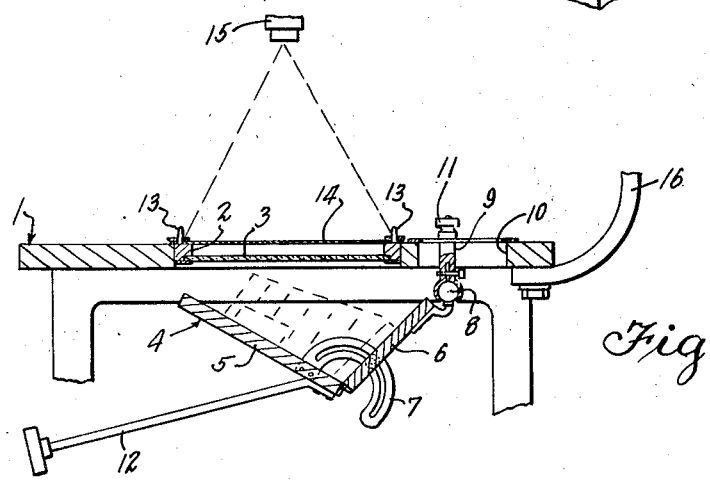
INVENTOR.
Walter E. Disney
BY Lyon & Lyon
ATTORNEYS May 21, 1940.   W. E. DISNEY   2,201,689
ART OF ANIMATION
Filed Sept. 1, 1936    4 Sheets-Sheet 2
Fig. 3.
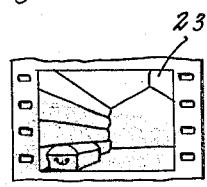
Fig. 5.
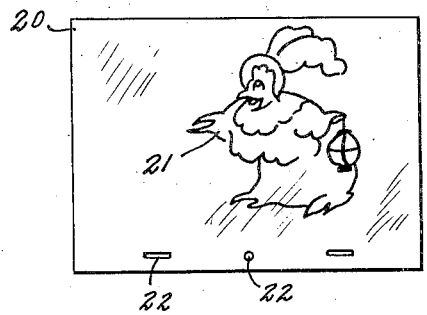
Fig. 4.
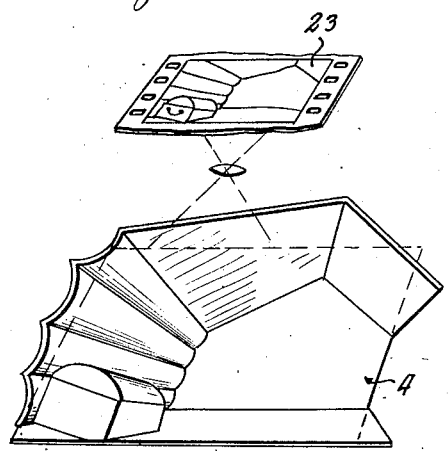
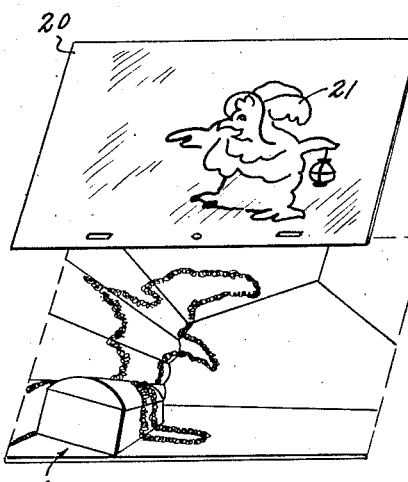
Fig. 6.
Fig. 7.
INVENTOR.
Walter E. Disney
BY Lyon & Lyon
ATTORNEYS May 21, 1940.  W. E. DISNEY  2,201,689
ART OF ANIMATION
Filed Sept. 1, 1936   4 Sheets-Sheet 3

INVENTOR.
Walter E. Disney
BY Lyon & Lyon
ATTORNEYS

May 21, 1940.        W. E. DISNEY        2,201,689
ART OF ANIMATION
Filed Sept. 1, 1936        4 Sheets-Sheet 4
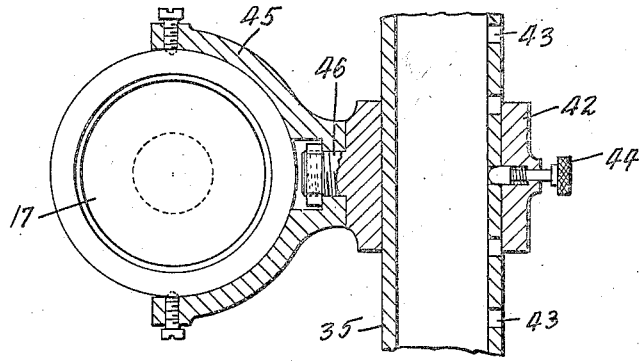
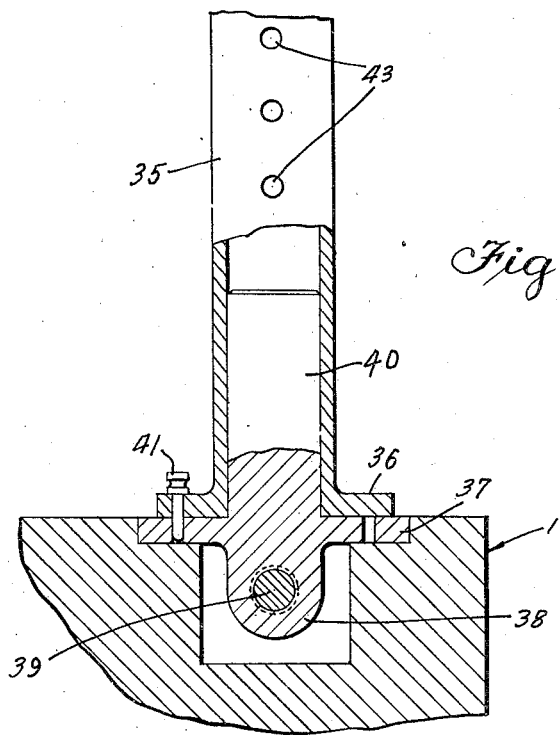
INVENTOR.
Walter E. Disney
BY Lyon & Lyon
ATTORNEYS Patented May 21, 1940

2,201,689

UNITED STATES PATENT OFFICE 2,201,689

ART OF ANIMATION

Walter E. Disney, Los Angeles, Calif., assignor to Walt Disney Productions, Los Angeles, Calif., a corporation of California Application September 1, 1936, Serial No. 98,896

8 Claims. (Cl. 88—16)

This invention is particularly directed to improvements in the art of producing what are generally known as "animated cartoons", this term being applicable to all instances in which drawn or painted representations of objects, characters, scenes and the like are recorded upon continuous film so that projection thereof creates the appearance of animation or movement in such drawn or painted characters and scenes.

In the preparation of such animated cartoons a considerable amount of action by a desired character, such as, for example, "Mickey Mouse", may take place in front of a relatively stationary, unchanging background. Under such conditions, the series of events taking place before such background is termed a scene of the entire play or story. Since such scene, when projected upon a screen, consists of a large number of photographic images of drawings or paintings, thousands of such drawings or paintings must be made. Ordinarily, the background of a given scene may be drawn or painted upon an opaque or transparent medium and a number of drawings of the character, actor or foreground figures are then made on separate transparencies. The foreground or character transparency is then placed over the background drawing and the two are photographed simultaneously.

In order to properly position the character with respect to the background appearing in the drawing, it is necessary in most instances to show the shadow of the character since the shadow assists greatly in creating the proper perspective and positioning of the character. Moreover, the shadow of the character must be placed with due regard to the lighting effect which has been depicted in the background. When the background is complicated, angular, or contains a number of objects such as, for example, a balustrade, it is extremely difficult for the animator to properly create, by drawing, the shadow of the character upon these background objects.

The present invention is particularly directed toward methods whereby the foreground object or character may be properly and accurately placed and correlated with respect to the background and accurate shadows rapidly produced so that the finished drawing (or combination of drawings) which is photographed in the production of the finished projection film, correctly and accurately locates the character with respect to the background and includes a virtually accurate shadow.

Moreover, the present invention permits the location and correlation of characters in given backgrounds in a very rapid manner so that accurate representations of shadows are obtained in a very minor fraction of the time which an animator would require if he was required to reconstruct the shadow by mental and manual processes alone.

Generally stated, the method of this invention comprises forming a three dimensional model of the desired background, projecting the image of the foreground character upon such three dimensional background, and utilizing the position of the character and its shadow with respect to the three dimensional background in locating and representing the shadow of such character in its correct relationship with said background upon the final drawing or photographic record.

An object of this invention, therefore, is to disclose and provide a method of procedure whereby the production of animated cartoons is expedited.

A further object of the invention is to disclose and provide a method of enhancing the dramatic effect of animated cartoons.

These and other objects, uses, advantages, adaptations and modifications of the invention will become apparent to those skilled in the art from the following detailed description of the preferred mode of operation and illustrative forms of devices whereby the method of the invention may be carried out.

In the drawings:

Fig. 1 is a perspective view of one form of apparatus in which the method of the invention may be carried out.

Fig. 2 is a transverse section taken through the apparatus of Fig. 1.

Fig. 3 is a photographic record of a background drawing.

Fig. 4 represents a three dimensional relief model (in foreshortened perspective) made in accordance with the drawing shown in the photographic record of Fig. 3.

Fig. 5 represents a drawing of a character to be used in an animated picture, said character to be eventually placed in the background shown in Fig. 3.

Fig. 6 is a perspective illustrating the casting of a shadow of the character shown in Fig. 5 upon the three dimensional background illustrated in Fig. 4.

Fig. 7 is a photographic record of the character, shadow and background on the finished film.

Fig. 10 is an enlarged view of the light source illustrated in Figs. 8 and 9.

Fig. 11 is an enlarged view of the lamp-post shown in Figs. 8 and 9.

Figure 8:
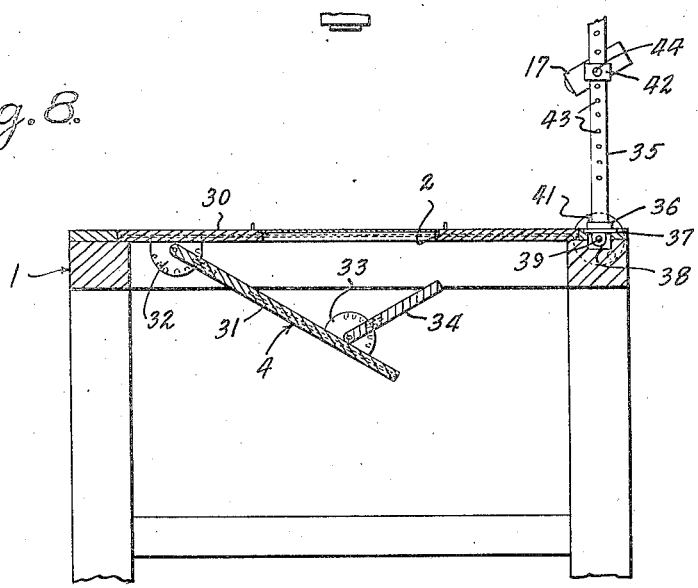
Fig. 8 is a vertical section of another form of device in which the method of this invention may be carried out.

As stated hereinbefore, the present invention is particularly directed to methods and means whereby animated cartoons may be produced with greater fidelity and ease. One of the simplest forms of apparatus which may be used in carrying out the present invention is illustrated in Figs. 1 and 2. As there shown, a table, generally indicated at 1, is provided with an aperture 2 in which there may be mounted a transparent glass plate 3. Movably positioned beneath this table and visible through the aperture 2 is a stage, generally indicated by the numeral 4. The stage 4 may consist of two members 5 and 6 which are hinged together and which may be adjustably positioned with respect to one another by means of a quadrant 7 attached to the member 5 and adjustably attachable to the member 6. The entire stage may be supported by means of a ball and socket joint 8 carried by a guiding and supporting member 9 slidably and adjustably mounted in a transverse slot 10. A lock nut 11 permits the stage to be adjustably positioned transversely of the table 1.

A handle 12 may be attached to the member 5 of the stage and by means of such handle the entire stage may be tilted in any desired direction upon the ball and socket joint 8. Means are also carried by the table 1 for locating and registering suitable transparencies, such registering and locating means being indicated at 13, and may comprise fixed pins capable of cooperating with carefully punched locating holes made in the edges of transparencies or translucent sheets 14.

Adjustably positionable above the table is a camera 15. By the term "camera" as used herein, reference will be made to any means capable of projecting a photographic transparency or the like, or a Bolopticon or other device capable of projecting an image from an opaque backing such as, for example, a drawing made on substantially opaque paper. Furthermore, the term "camera" as used herein not only refers to a projecting means but also to a means capable of recording a photographic image of what is observed by such camera on the table and on the stage. The camera 15 is shown in Fig. 1 to be vertically adjustable, being slidably and adjustably mounted upon a suitable support 16. Movably carried by the table 1 is a light source, generally indicated at 17, said light source being preferably of such character as to direct a substantially parallel beam of light upon the stage through the aperture 2.

The various elements described are then preferably employed in producing composite drawings of figures or characters and backgrounds. By the term "character", reference will be made herein to any drawing or representation of an animated, fanciful or realistic character. It is to be understood that such characters may be either in the immediate foreground, in the middle ground, or may even be caused to move into and beyond the so-called background.

In the preparation of animated cartoons, it is customary to make a background drawing for a given scene and then to make a plurality of character drawings. The background drawing and the character drawing are generally made on transparencies and may be drawn in black and white or black and gray paints or inks, or such drawings may be executed in colored paints so that during subsequent step-by-step photography of background drawings and character drawings in correctly superimposed relation, the frames of the film depict the background and the character in their correct relationship and in the desired sequence.

In accordance with this invention, drawings of the desired background are made and in most cases a photographic record, generally on motion picture film, is made of such background. Fig. 3 represents a background drawing 23 photographed upon a strip of film. Separate drawings are made of the character (or characters) which it is desired to place in such background. Fig. 5, for example, illustrates a sheet of substantially transparent material 20 bearing a drawing 21 of a character. It is to be remembered that the drawing 20 is but one of a large number showing the character in various positions which it assumes during the scene. Attention is called to the fact that the edges of this transparency 20 are provided with registered holes 22 adapted to cooperate with the registration pins 13 referred to hereinabove.

The background 23 depicts the interior of a log cabin and it may be assumed that the scenario calls for light, emitted by the lantern carried by the character, to cast a shadow upon the rough wall of the cabin. It would be extremely difficult to correctly create, by drawing, the shadow of this character upon the trunk and walls of the cabin. The solution of this problem is one of the objects of this invention and is attained in the following manner:

After the background drawing has been photographed to produce a film such as is shown in Fig. 3, the photographic record is projected by the camera 15 upon the stage 4 which is adjusted by means of the elements shown in Figs. 1 and 2. The walls, trunk and portions of the ceiling are then molded, fitted, or otherwise arranged upon the stage 4 so as to fit the projected image of the background. By using the projected image, the molding of the three dimensional background on the stage is greatly facilitated. In Fig. 4 the relationship between the projected image and the stage is brought out diagrammatically.

After the background has been made in this manner upon the stage 4, projection is discontinued and the transparency 20 bearing the character 21 is fitted upon the registration pins 13. The light source 17 is then adjustably positioned on the left so as to create the effect of light from the lantern falling upon the stage and background. The character 21 is in the foreground and the light source 17 will then throw a shadow of such character upon the stage 4. If the character 21 is simply outlined, such outline will be visible upon the stage 4. In some instances it is desirable to have the character 21 not only outlined in opaque pigments but completely filled in with a translucent paint so that a relatively faint but distinct shadow of the entire character is visible on the stage. The relation between the transparency 20 and the stage 4, and the resultant shadow, are shown in Fig. 6.

After these arrangements have been made, the camera 15 is used in photographing the stage and shadow thrown thereon. As a matter of fact, the resulting photograph will depict the character 21, the stage or background carried by the stage, and the shadow of the character with relation to the objects in the background. A photograph thus taken will now bear a record of the character 21, the background and a shadow of the character. Since the depth of focus of the lens used in the camera 15 during this operation may not be sufficient to show both the shadow and the character outlines with absolute clarity, this photograph is not used as a final photoplay print. It may be noted that during the taking of this photograph the only source of light is that supplied by the lamp 17. It is to be noted that the lamp 17 is angularly displaced with respect to the point of view of the camera 15 so that the perspective observed by and photographed by the camera 15 differs from the perspective of the image or shadow projected upon the three dimensional background or stage by the light 17.

The photograph showing the character, its shadow and the background is then separately projected onto a suitable transparency and the animator draws the background and character as well as the shadow in accordance with the indications on the photograph. These finished composite drawings are suitably filled in with wash colors or pigments and are then photographed in correct sequence in the usual manner, thereby producing a finished cartoon photoplay. A detailed description of such operations need not be given here since such operations are well known in the art. A single complete photograph, suitable for projection use, is shown in Fig. 7.

The dramatic effect obtained by correctly representing the shadows of characters with respect to their backgrounds is quite remarkable and produces a most realistic effect. In some animated cartoons now being produced, top lighting of the character is resorted to, an attempt being made by mental processes of the animator alone to make a smaller blot or shadow immediately around the feet of the character. Very often such top lighting is not maintained throughout a photoplay or scene and as a result an unnatural effect or impression is conveyed to the observer. Many scenes, of course, necessitate angular lighting and it is practically impossible to reproduce by a mental process a true and correct representation of the shadow on an irregular or broken background. The method of this invention produces realistic effects quickly and accurately.

Another form of device which may be used is illustrated in Figs. 8 to 11. The table 1 is provided with a longitudinally movable portion 30, such portion containing a glassed-in aperture. The stage, generally indicated at 4, is movable transversely of the table 1, each of the segments 32 being provided with a tongue slidably fitting into a transverse groove in each end of the table 1. Member 31 of the stage is pivotally connected to the segments 32.

Locking or adjusting pins are carried by the edges of the member 31, such locking or adjusting means cooperating with the segments 32 so as to adjustably position the member 31. The member 31 in turn carries movably adjustable segments 33 slidably mounted in grooves formed near the edges of the member 31. The board 34 is pivotally attached to the segments 33 and is also provided with means whereby the angular position of the board 34 with respect to the member 31 may be adjustably fixed. Along one edge of the table 1 is a movable and adjustable light source. Such light source may be mounted upon a post 35 provided with a bottom flange 36. This post rests upon a plate 37 slidably mounted in a groove running along the edge of the table 1. The plate 37 is firmly connected to an end portion 38 through which an externally threaded rotatable shaft 39 extends. The plate 37 is provided with an upstanding stud 40 journaled within the post 35, thereby permitting the entire post 35 to be rotated about said stud. Rotation of the threaded shaft 39 will cause the entire plate 37 and post 35 carried thereby to be moved to a desired position longitudinally of the table.

The flange 36 may be provided with a plurality of perforations which may be consecutively numbered whereas the plate 37 has but a single aperture therein so that when an aperture in the flange 36 is in alignment with an aperture in the member 37, the entire post 35 may be fixed in such position by simply dropping the pin 41 through such apertures, as shown in Fig. 11.

The post itself carries a light source capable of supplying virtually collimated light. This lamp 17 is supported by a bracket 42 which is adjustably positionable up or down the post 35. Such vertical adjustment of the lamp 17 may be accomplished by means of a plurality of spaced apertures 43 carried by the post 35, a locking pin 44 carried by the bracket 42 being selectively positionable in the desired aperture for holding the lamp at the required height. Preferably the apertures 43 are serially numbered so that again the position of the lamp vertically may be noted for future reference. The bracket 42, moreover, is provided with a lamp holder 45 which is adjustably positionable about a horizontal pivot pin 46.

By the provision of means of the character stated, the position of the light source may be noted with great completeness and the light source moved to a position identical to that assumed in taking a previous scene by simply referring to the record of longitudinal adjustment, vertical adjustment and angular adjustment previously made.

Figure 9:
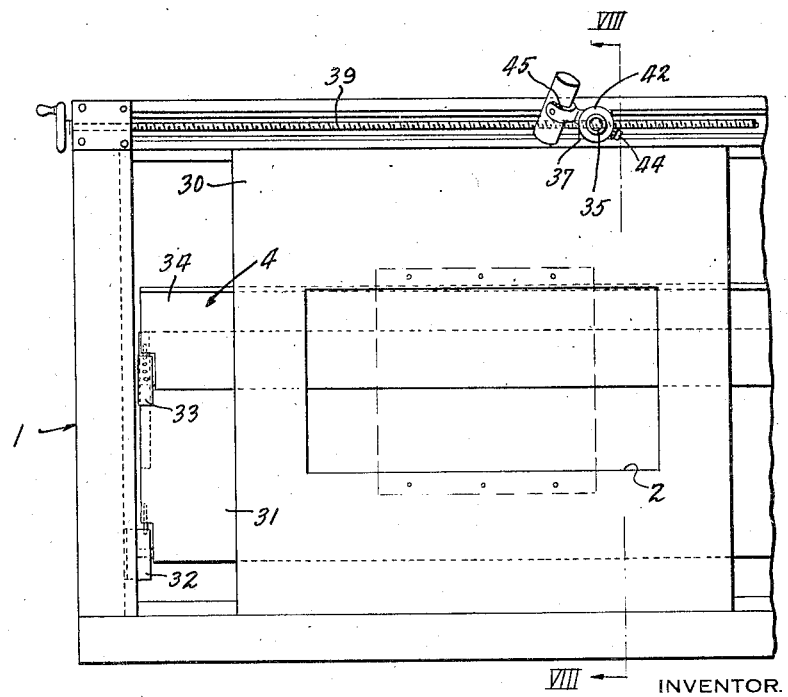
Fig. 9 is a plan view of the device shown in Fig. 8.

The camera is positioned above the table 1 of the device shown in Figs. 8 and 9 but is not shown in the drawings. As stated previously, the camera is preferably vertically adjustable and if desired means may be provided for adjustably positioning the camera vertically and also in a horizontal plane. Such adjustments are of value whenever the stage depicts a fairly long background or a large background since then the camera may be either focused upon a desired portion of the stage and then moved to different positions to take in other portions of the stage, or may be vertically moved so as to depict a long shot of the stage and background carried thereby and then gradually moved downwardly toward the stage, thereby duplicating what is referred to in actual motion picture practice as a perambulator shot, terminating in a close-up of just a portion of the background.

It is to be remembered that the background which is formed on the stage 4 from drawings previously made may be in bas relief or other three dimensional form. In rare instances the background may be plane.

Although in the procedure described hereinabove the three dimensional background was created or molded on the stage from a drawing and such model or stage background was built by the aid of projected images of the background, this particular sequence of steps need not be used. In many instances it may be more convenient to first model the entire background upon the stage and then photograph the modeled background, utilizing the photographs thereof in producing the drawings.

When it is desired that the entire area of the character cast a shadow (instead of simply the outline thereof), then in that event a finely divided dilute suspension of a pigment in a suitable vehicle should be employed. The use of wetting agents such as cetyl alcohol, Tergitol, Alphasol, etc., stabilizes the suspension or dispersion and facilitates even drying of such suspension over the entire area even though the character figure is painted on a transparency such as Celluloid.

In a modified form of the method, a photograph may be taken of the character drawing. The negative will be entirely opaque but the outlines of the character drawings will be transparent. This negative may then be projected upon the stage, the camera directed upon the stage recording the outline of the shadow.

Although in the description given hereinabove particular reference has been had to the formation of shadows, the method may also be used in obtaining reflections. In many instances the final projection print needs show a distorted reflection of a character as, for example, in a curved reflecting surface as a bottle, dish, cup or the like. Such distorted images may be obtained in substantially the same manner as that described hereinabove, a suitably curved reflecting surface being substituted for the solid, substantially nonreflective materials normally employed in forming the three dimensional backgrounds. By the term "image as modified by the shaped background" used in the claims herein, reference is made to shadows and/or reflections of the character since in both instances the images are modified, altered, distorted, or otherwise transformed by the background either as a projected shadow image or as a projected detailed image.

Although rather specific forms of devices have been described and the preferred method has been disclosed in detail, it will be evident to those skilled in the art that the methods of this invention may be modified considerably without departing from the teachings of this invention. All changes, modifications, adaptations and uses coming within the scope of the appended claims are embraced thereby.

I claim:

1. In the production of animated cartoons, the steps of: forming a linear representation of a cartoon character on a transparency, forming a three dimensional background capable of distorting an image projected thereon, projecting the cartoon character from said transparency onto said three dimensional background whereby the projected image of the character is modified and distorted by the background, and then photographing the position of the projected and distorted image from a point of view removed sufficiently from the point of projection to produce a photographic record showing the distorted image and background in a different perspective.

2. In the production of animated cartoons, the steps of: forming a linear representation of a cartoon character on a transparency, forming a shaped three dimensional background, positioning said transparency between said background and a camera, passing light through said transparency to project an image of said character onto said shaped three dimensional background, whereby said image is modified by said background, and then photographing said transparency and the projected image as modified by said shaped background on the same film in said camera.

3. In the production of animated cartoons, the steps of: forming a linear representation of a cartoon character on a transparency, forming a shaped three dimensional background, positioning said transparency between said background and a camera, passing light through said transparency to project an image of said character onto the shaped three dimensional background whereby said image is modified by said background, then photographing said transparency and the projected image as modified by said background upon a single film in said camera, and then preparing a drawing of the background, character and character image as modified by the background, and locating the relative positions of the background, character and character image in accordance with said photograph.

4. In the production of animated cartoons, the steps of: forming a drawing of a cartoon character, making a separate drawing of a desired background for the said character, forming a shaped three dimensionl background in accordance with said background drawing, said shaped background being capable of distorting an image projected thereon, projecting an image of the cartoon character from said drawing onto said three dimensional background from a point of projection to form a projected image of said character distorted by said background, and then photographing the distorted projected image from a point of view angularly displaced from the point of projection sufficiently to produce a photographic record showing the distorted image in a different perspective than that visible from the point of projection.

5. In the production of animated cartoons, the steps of: forming a shaped three dimensional background capable of distorting an image projected thereon, placing a representation of a foreground object in desired position in front of the shaped background; projecting a shadow of said foreground object upon the shaped background from a point of projection, and photographing the projected shadow as distorted by the background upon a film from a point of view removed sufficiently from the point of projection to produce a photographic record showing the distorted shadow in a different perspective than that visible from the point of projection.

6. In the production of animated cartoons, the steps of: forming a shaped three dimensional background capable of distorting an image projected thereon, placing a representation of a foreground object in desired position in front of the shaped background, projecting an image of said foreground object upon the shaped background from a desired point of projection, and making a photographic record of the projected image of the foreground object as distorted by the background, of said foreground object and of said background, upon a single film from a point of view sufficiently removed from the point of projection to produce a photographic record showing the distorted image and background in a different perspective than that visible from the point of projection.

7. In the production of animated cartoons, the steps of: forming a drawing of a cartoon character, making a drawing of a desired background for the said character, forming a three dimensional shaped background in accordance with said background drawing, projecting an image of the cartoon character from the said drawing onto said shaped background to form a projected image distorted by said shaped background, and photographing the projected image while it is upon said background from a point of view removed sufficiently from the point of projection to produce a photographic record showing the image and background in a different perspective.

8. In a method of producing animated cartoons, the steps of: projecting an image of a character upon a three dimensional shaped background to form a projected image distorted by said background, photographing the projected image while it is upon said background from a point of view sufficiently removed from the point of projection to produce a photographic record showing the distorted image and background in a different perspective, and then correlating the character and its distorted shadow image from the photographic record in making an animated cartoon.

WALTER E. DISNEY.